United States Patent
Bitonti et al.

(10) Patent No.: US 8,098,089 B2
(45) Date of Patent: Jan. 17, 2012

(54) VOLTAGE BOOSTER

(75) Inventors: Davide Bitonti, Catanzaro (IT); Andrea Castaldo, Ercolano (IT); Angela Foschini, Guardia Sanframonti (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 65 days.

(21) Appl. No.: 11/495,875

(22) Filed: Jul. 28, 2006

(65) Prior Publication Data
US 2008/0024198 A1 Jan. 31, 2008

(51) Int. Cl.
*H03L 5/00* (2006.01)
(52) U.S. Cl. .......................... 327/534; 327/536; 327/589
(58) Field of Classification Search .......... 327/534–538, 327/589
See application file for complete search history.

(56) References Cited

U.S. PATENT DOCUMENTS

| | | | | |
|---|---|---|---|---|
| 6,069,518 A | * | 5/2000 | Nakai et al. | 327/535 |
| 6,294,950 B1 | * | 9/2001 | Lee et al. | 327/539 |
| 6,300,839 B1 | * | 10/2001 | Bazargan et al. | 331/57 |
| 6,337,595 B1 | * | 1/2002 | Hsu et al. | 327/538 |
| 6,486,728 B2 | * | 11/2002 | Kleveland | 327/536 |
| 6,717,458 B1 | * | 4/2004 | Potanin | 327/536 |
| 6,738,272 B2 | * | 5/2004 | Yamanaka et al. | 363/60 |
| 6,791,212 B2 | * | 9/2004 | Pulvirenti et al. | 307/113 |
| 6,816,001 B2 | * | 11/2004 | Khouri et al. | 327/536 |
| 6,891,764 B2 | * | 5/2005 | Li | 365/189.15 |
| 7,253,676 B2 | * | 8/2007 | Fukuda et al. | 327/536 |

FOREIGN PATENT DOCUMENTS

EP 0596228 * 9/1993

* cited by examiner

*Primary Examiner* — Dinh T. Le
(74) *Attorney, Agent, or Firm* — Lisa K. Jorgenson; Kevin D. Jablonski; Graybeal Jackson LLP

(57) ABSTRACT

A voltage booster for generating a boosted voltage, including a charge pump adapted to generate the boosted voltage starting from a supply voltage by a transfer of electric charge controlled by at least one oscillating signal having an oscillation frequency; an oscillator for providing the oscillating signal; and a regulation circuit arranged to receive and perform a comparison of a voltage related to the boosted voltage and a reference voltage, and adapted to provide at least one regulation signal indicative of a result of said comparison, wherein said regulation signal is fed to the oscillator to control said oscillation frequency. The regulation circuit is adapted to cause the at least one regulation signal take one among a plurality of discrete values, depending on the result of the comparison, so that the oscillation frequency of the at least one periodical signal accordingly can take one among a plurality of discrete oscillation frequency values.

32 Claims, 4 Drawing Sheets

VOLTAGE BOOSTER

BACKGROUND

1. Technical Field

An embodiment of the present disclosure relates to a voltage booster, particularly for the use in Integrated Circuits (IC).

2. Description of the Related Art

Voltage boosters are used to generate voltages higher, or of opposite polarity than a supply voltage thereof. For example, voltage boosters are integrated in non-volatile semiconductor memory device ICs, which need different voltages depending on the operation that has to be performed on the memory cells; in particular, a program operation and an erase operation of the semiconductor memory device typically require relatively high voltages (higher than the IC supply voltage) or negative voltages (compared to the IC reference voltage). Voltage boosters are in particular exploited to generate on-chip the voltages necessary for the IC operation, when such voltages are not supplied to the IC from the outside.

Typically, the voltage booster includes a charge pump, i.e., a circuit for boosting voltages starting from an input voltage lower, or of different polarity than the required voltage.

The operation of a charge pump is based on the continuous accumulation and transfer of electric charge through cascade-connected circuital stages, including charge-storage elements, particularly capacitors. In this way, a voltage across the capacitors increases moving from a charge pump input terminal, that receives the input voltage, to a charge pump output terminal, at which a boosted voltage is made available. Each stage of the charge pump is selectively coupled to adjacent stages by means of electronic switches, which alternately close and open for accumulating and then for transferring electric charge. The operation of the charge pump is controlled by properly phased periodic timing signals.

The output terminal of the charge pump is coupled to a circuital load, represented by the circuit structures that receive the boosted voltage, and that sink a corresponding current. The impedance of the circuital load may significantly vary; for example, this occurs in a memory device, in which a different number of memory cells can be programmed or erased at a time. Depending on the impedance of the circuital load, the current sunk from the charge pump varies, and accordingly the electric charge transfer rate necessary for sustaining the sunk current varies. In order to keep the boosted voltage close to a target value, the frequency of the charge pump timing signals has to increase or to decrease in accordance with the increase or the decrease of the current sunk (so as to correspondingly increase or decrease the electric charge transfer rate).

The timing signals are typically generated by an oscillator circuit. A voltage regulator receives the boosted voltage at the charge pump output and produces corresponding regulation signals, indicative of the difference between the boosted voltage and a reference voltage. The regulation signals are supplied to the oscillator, to modulate a frequency of the charge pump timing signals.

Usually, a continuous, i.e. analog frequency modulation of the timing signals is provided. In the design of voltage boosters, account must be taken of the particular circuital load of the charge pump (such as the particular memory device) and the technology exploited for the integration process. Accordingly, a voltage booster operating with analog frequency modulation has a relatively complex design that, in addition, does not ensure a stability against process parameters spreads.

Furthermore, a voltage booster with analog frequency modulation has a relatively slow response, so it may not be suitable for applications involving impulsive power consumption, and occupies a relatively large chip area, due to the need of providing compensation capacitors for ensuring stability of the feedback loop. This opposes the continuous quest for speeding up and shrinking ICs, such as memory.

SUMMARY

In view of the state of the art outlined in the foregoing, one of the problems faced has been how to provide a voltage booster which is simple in its implementation, fast in operation, and that occupies a relatively small chip area.

According to an embodiment of the present disclosure, a voltage booster is provided for generating a boosted voltage, the booster including:
  a charge pump adapted to generate the boosted voltage starting from a supply voltage by a transfer of electric charge controlled by at least one oscillating signal having an oscillation frequency;
  an oscillator for providing the oscillating signal; and
  a regulation circuit arranged to receive and perform a comparison of a voltage related to the boosted voltage and a reference voltage, and adapted to provide at least one regulation signal indicative of the result of said comparison, wherein said regulation signal is fed to the oscillator to control said oscillation frequency.

The regulation circuit is adapted to cause the at least one regulation signal take one among a plurality of discrete values, depending on the result of said comparison, so that the oscillation frequency of the at least one periodical signal accordingly can take one among a plurality of discrete oscillation frequency values.

BRIEF DESCRIPTION OF THE DRAWINGS

Features and the advantages of one or more embodiments the present disclosure will be made apparent by the following description of an embodiment thereof, provided merely by way of non-limitative example, description that will be conducted making reference to the attached figures.

DETAILED DESCRIPTION

Figure 1:
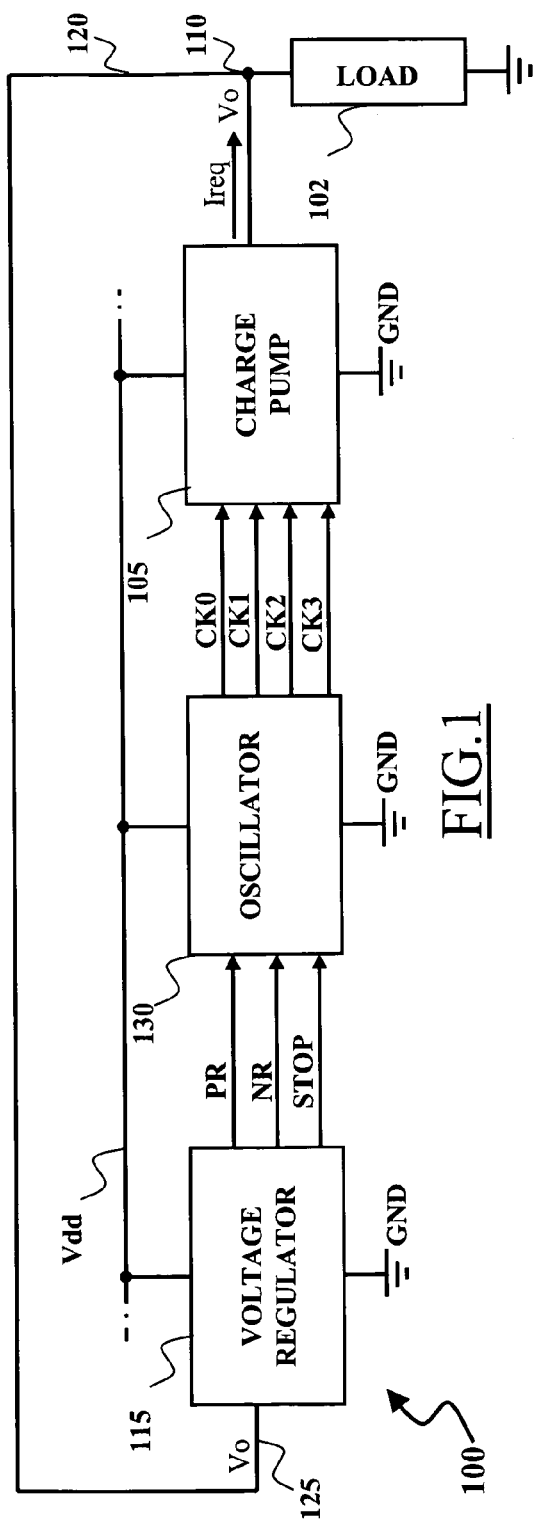
FIG. 1 schematically shows a voltage booster, in terms of the functional blocks relevant to the understanding of the embodiment to be described.

With reference to the drawings, in particular to FIG. 1, a voltage booster 100 is schematically illustrated, in terms of the functional blocks relevant to the understanding of the embodiment to be described. The voltage booster 100 is intended to be integrated in a semiconductor chip together with, for example, a flash memory (not shown in the drawing). Typically, for program and erase operations the flash memory requires an operation voltage Vo (e.g. up to 20 V) higher than a supply voltage Vdd (e.g. of 3 V) supplied to the memory from outside and distributed through a voltage supply line Vdd. In use, the voltage booster 100 generates the operation voltage Vo to be supplied, for example, to program circuits of the flash memory, acting as a circuital load 102 for the voltage booster 100 and sinking a current Ireq.

The voltage booster 100 includes a charge pump 105 adapted to generate the boosted voltage to be used as operation voltage Vo starting from the supply voltage Vdd, as it will be described herein below. The charge pump 105 makes the boosted voltage Vo available at an output terminal 110 of the voltage booster 100.

The voltage booster 100 further comprises a voltage regulator 115 supplied between the supply voltage Vdd and a reference voltage, such as ground, distributed through the IC by means of a reference voltage supply line GND. The voltage regulator 115 receives the boosted voltage Vo at an input terminal 125 thereof, through a feedback circuital branch 120 coupled to the output node 110 of the high voltage generator 110.

The voltage regulator 115 supplies a plurality of regulation signals to an oscillator 130 of the voltage booster 100. Particularly, the plurality of regulation signals includes a first regulation signal PR and a second regulation signal NR; the first and second regulation signals PR and NR take values that depend on a value of the boosted voltage Vo. In addition, the voltage regulator 115 provides to the oscillator 130 a logic signal STOP for enabling/disabling the oscillator 130.

The oscillator 130 generates clock signals CK0, CK1, CK2 and CK3 for controlling the operation of the charge pump 105; the clock signals CK0-CK3 are periodic isofrequential signals of frequency f that depends on the first regulation signal PR and the second regulation signal NR.

Figure 2:
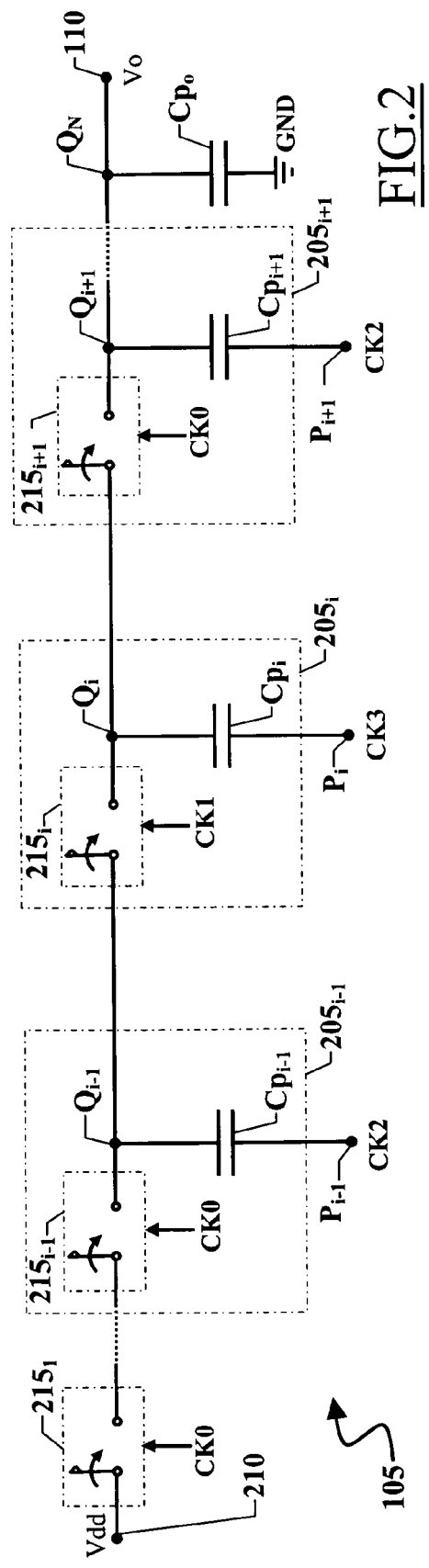
FIG. 2 shows a simplified circuital scheme of a charge pump included in the voltage booster of FIG. 1 according to an embodiment of the disclosure.

Considering now FIG. 2, a simplified circuital scheme of the charge pump 105 is shown. The charge pump 105 includes a number N (for example, eight) of circuital stages that are cascade-connected between a charge pump input terminal 210, that receives the supply voltage Vdd, and the charge pump output terminal, coupled to the output terminal 110 of the voltage booster 100, at which the boosted voltage Vo is made available. In the drawing, only three stages of the plurality of N stages are depicted, denoted $205_{i-1}$, $205_i$ and $205_{i+1}$ (i.e., three generic intermediate stages). Hereinafter, the generic charge stage will be denoted $205_j$, with the index j taking any value in the range 1, ..., (i−1), i, (i+1), ... N.

Each charge pump stage $205_j$ includes a capacitor $Cp_j$ having a capacitance relatively high (such as 1-10 pF) and an electronic switch $215_j$. A plate of the capacitor $Cp_j$ is coupled to a first terminal of the switch $215_j$, that defines a circuital node $Q_j$. A second terminal of the switch $215_j$ is coupled to the circuital node $Q_{j-1}$ of the previous stage $205_{j-1}$ (the second terminal of the switch 215, in the first charge pump stage is coupled to the charge pump input terminal 210, i.e. it receives the supply voltage Vdd). The last circuit node $Q_N$ is coupled to the output terminal 110; an output capacitor $Cp_o$ is further coupled between the output terminal 110 and the reference voltage supply line GND.

The two clock signals CK0 and CK1 are used for controlling the switches $215_1$-$215_N$. The clock signals CK0 and CK1 are alternately applied to each pair of adjacent switches $215_1$-$215_N$ (i.e., switches belonging to adjacent stages); for example, assuming that the clock signal CK1 is applied to a generic switch $215_j$, the clock signal CK0 is applied to the two adjacent switches $215_{j-1}$ and $215_{j+1}$. The clock signals CK0 and CK1 are periodic signals in phase opposition, and their frequency f is relatively high (typically of some tens of MHz). The clock signals CK0 and CK1 switch between an opening voltage and a closing voltage of the corresponding switches $215_1$-$215_N$, particularly between the supply voltage Vdd and the ground voltage.

The clock signals CK2 and CK3 are used for controlling the capacitors $Cp_i$. The clock signals CK2 and CK3 are applied alternately to any pair of adjacent capacitors $Cp_1$-$Cp_N$; for example, the clock signal CK3 is applied to a terminal $P_j$ coupled to the free plate of the capacitor $Cp_j$, while the clock signal CK2 is applied to the terminals $P_{j-1}$ and $P_{j+1}$ coupled to the respective free plates of the adjacent capacitors $Cp_{j-1}$ and $Cp_{j+1}$. Also the clock signals CK2 and CK3 are periodic signals in phase opposition, and switch between the ground voltage and the supply voltage Vdd with the frequency f.

For describing the operation of the charge pump 105, an ideal open-circuit operating condition is firstly considered (i.e., the circuital load is assumed to have an infinite impedance). Initially, the switch $215_1$ is closed by the clock signal CK0, while the switch $215_2$ is opened by the clock signal CK1; at the same time, the plate of the capacitor in the first stage is kept at the ground voltage by the clock signal CK2, while the clock signal CK3 is at the supply voltage Vdd. In such a condition, the capacitor in the first stage is charged at the voltage Vdd. When the clock signals CK0-CK3 switch, the switch $215_1$ opens, while the switch in the second charge pump stage is closed; at the same time, the plate of the capacitor in the first charge pump stage is brought to the supply voltage Vdd, while the plate of the capacitor in the second charge pump stage is brought to ground. Accordingly, the other plate of the capacitor in the first charge pump stage is boosted to a voltage ideally equal to twice the supply voltage Vdd, and then the capacitor in the second charge pump stage is charged to twice the supply voltage Vdd. Similarly, the capacitor in the third charge pump stage is charged to a voltage equal to three times the supply voltage Vdd, and so on to the capacitor in the last charge pump stage, and then to the output capacitor $Cp_o$, which is ideally charged to a voltage equal to N-times the supply voltage Vdd.

In a real operation, a load coupled to the output terminal 110 drains current from the charge pump output, and thus discharges the output capacitor $Cp_o$ and the capacitor in the last charge pump stage; accordingly, a charge pump output voltage decreases with respect to the ideal value of N•Vdd. The electric charges taken away are periodically restored, with a frequency f.

When the current drained by the load 102 becomes significant (i.e., the load impedance is relatively low), the replenishment rate of the capacitors in the charge pump stages may be not sufficient to compensate for the electric charges taken away by the load; thus, the charge pump output voltage falls from the ideal value.

The frequency f of the clock signals CK0-CK3 determines the electric charge transfer rate through the stages of the charge pump, and thus the rate of replenishment of the capacitor at the charge pump output. Choosing a proper value for the charge pump clocking frequency f, it is possible to compensate the draining of current by the charge pump load.

The value of the load, and thus of the drained current, may however vary. For example, in memory devices the charge pump load, assumed to represent the circuits for programming the memory cells, varies with the number of memory cells to be programmed (such a number varies during the program operation, for example because memory cells that are assessed to have reached a target programming state are disconnected from the programming circuits); thus, the current Ireq drained from the charge pump varies. The voltage regulator 115 is designed to vary the value of the frequency f so as to track variations in the drained current, and to keep the charge pump output voltage relatively stable at the target value.

Figure 3:
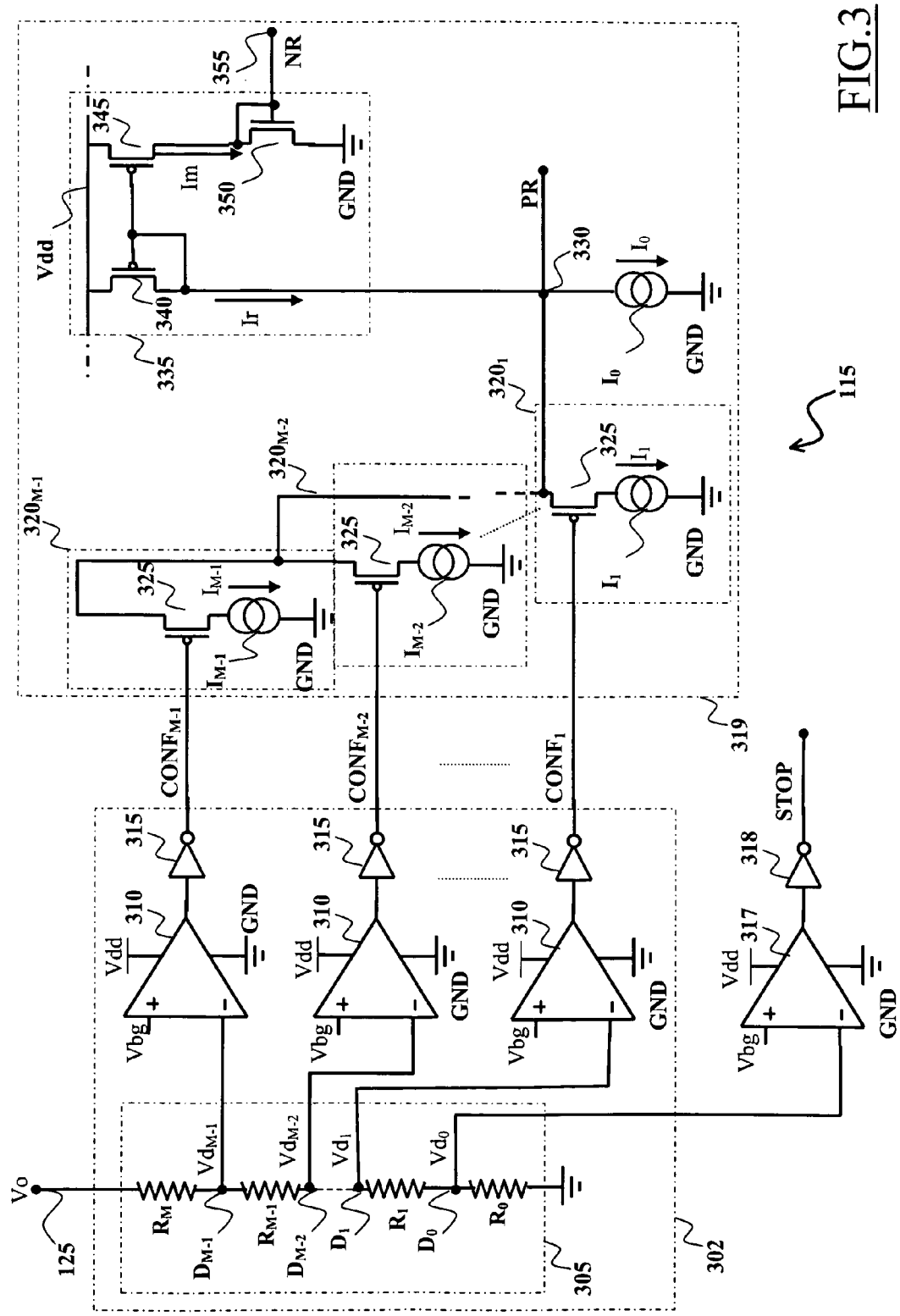
FIG. 3 illustrates a voltage regulator, included in the voltage booster of FIG. 1, according to an embodiment of the disclosure.

A voltage regulator 115 according to an embodiment of the present disclosure is shown in FIG. 3.

The voltage regulator 115 includes an Analog-to-Digital Converter (ADC) 302 adapted to generate a plurality of logic signals $CONF_1$-$CONF_{M-1}$ corresponding to the current value of the charge pump output voltage Vo.

The ADC 302 comprises a voltage divider 305, including, for example, a series of resistors $R_0$-$R_M$, with a number M (for example, five) of intermediate taps for providing M down-scaled voltages $Vd_0$-$Vd_{M-1}$ (accordingly, the resistors $R_0$-$R_M$ are M+1 in number). The resistor $R_0$ has a first terminal coupled to the reference voltage supply line GND and a second terminal coupled to a first terminal of the adjacent resistor $R_1$ at a circuital node $D_0$. The resistor $R_1$ has a second terminal coupled to a first terminal of the adjacent resistor $R_2$ at a circuital node $D_1$ and so on to the resistor $R_M$, which has a first terminal coupled to the second terminal of the adjacent resistor $R_{M-1}$ at a circuital node $D_{M-1}$ and a second terminal coupled to the input terminal 125 for receiving the operation voltage V0. Each node $D_0$-$D_{M-1}$ forms one of the intermediate taps from which one of the down-scaled voltages $Vd_0$-$Vd_{M-1}$ is taken, the value of the generic down-scaled voltage being a fraction of the voltage V0 at the output of the charge pump in accordance with the resistance shown between the node $D_0$-$D_{M-1}$ and ground.

The ADC 302 further includes a plurality of M−1 (voltage) comparators 310, e.g. formed by operational amplifiers, supplied between ground and the supply voltage Vdd. Each operational amplifier 310 receives at a non-inverting input terminal "+" thereof a reference voltage Vbg, supplied thereto by a reference voltage generator (not shown in the drawing) included in the flash memory. Preferably, but not limitatively, the reference voltage generator is a band-gap reference voltage generator, capable of providing the band-gap reference voltage Vbg which is very stable, particularly against operating temperature variations.

An inverting terminal "−" of each operational amplifier 310 is coupled to a respective node $D_1$-$D_{M-1}$ for receiving the corresponding down-scaled voltage $Vd_1$-$Vd_{M-1}$. Each operational amplifier 310 compares the received down-scaled voltage $Vd_1$-$Vd_{M-1}$ to the band-gap voltage Vbg and provides a result of this comparison at an output terminal thereof.

The output terminal of each operational amplifier 310 is coupled to an input terminal of a respective inverter 315 (supplied between ground and the supply voltage Vdd). An output terminal of each of the inverters 315 in turn supplies a respective logic signal $CONF_1$-$CONF_{M-1}$ taking a high logic value '1' (i.e. the value of the supply voltage Vdd), if the corresponding down-scaled voltage $Vd_0$-$Vd_{M-1}$ is higher than the band-gap voltage Vbg, or a low logic value '0' (i.e. 0 V), if the corresponding down-scaled voltage $Vd_0$-$Vd_{M-1}$ is lower than the band-gap voltage Vbg.

The voltage regulator 115 includes a further (voltage) comparator 317, also formed by an operational amplifier, receiving the down-scaled voltage $Vd_0$ at an inverting terminal "−" and the band-gap voltage Vbg at a non-inverting terminal "+". An output terminal of the operational amplifier 317 is coupled to an input terminal of a further inverter 318, which supplies the logic signal STOP at an output terminal thereof.

The logic signal STOP is directly provided to the oscillator 130, as described in greater detail in the following. Instead, the logic signals $CONF_1$-$CONF_{M-1}$ are provided to a Digital-to-Analog Converter (DAC) 319 of the voltage regulator 115, adapted to generate the first and second regulation signals PR and NR corresponding to the sequence of logic signals $CONF_1$-$CONF_{M-1}$, i.e. to the value of the operation voltage Vo.

Each logic signal $CONF_1$-$CONF_{M-1}$ is provided to a respective circuit branch $320_1$-$320_{M-1}$ of the DAC 319. A generic one of the circuit branches $320_1$-$320_{M-1}$ includes a p-MOS transistor 325 having a gate terminal coupled to the output terminal of the respective inverter 315 for receiving the corresponding logic signal $CONF_1$-$CONF_{M-1}$. A drain terminal of the transistor 325 is coupled to a first terminal of a current generator $I_1$-$I_{M-1}$, supplying a current $I_1$-$I_{M-1}$, a second terminal thereof being coupled to the reference voltage supply line GND. A source terminal of all the transistors 325 is coupled to a first output node 330. A further current generator $I_0$, supplying a current $I_0$, has a first terminal coupled to the first output node 330 and a second terminal coupled to the reference voltage supply line GND. It is observed that the specific values of the currents $I_0$-$I_{M-1}$ are arbitrary, and are not limited to particular values; the currents $I_0$-$I_{M-1}$ may take equal or different values from one another.

The DAC 319 further includes a current-mirror stage 335 that comprises a diode-connected p-MOS transistor 340 having a drain terminal coupled to a gate terminal thereof; the drain terminal of the transistor 340 is coupled to the first output node 330 and a source terminal thereof is coupled to the voltage supply line Vdd. The current-mirror stage 335 comprises a further p-MOS transistor 345 having a gate terminal coupled to the gate terminal of the transistor 340 and a source terminal coupled to the voltage supply line Vdd. The transistor 345 has a drain terminal coupled to a drain terminal of a diode-coupled n-MOS transistor 350, the drain and gate terminals of the transistor 350 being coupled together to a second output node 355; the source terminal of the transistor 350 is coupled to the reference voltage supply line GND.

The first regulation signal PR is made available at the first output node 330, while the second regulation signal NR is made available at the second output node 355.

In operation, when the boosted voltage Vo, down-scaled by a scaling factor equal to the ratio of the resistance of the resistor $R_0$ to the total resistance of the voltage divider 305, is lower than the band-gap voltage Vbg, the logic signal STOP is at the low logic value '0', thereby enabling the oscillator to oscillate; with the oscillator enabled, the charge pump is activated and clocked, and transfers charge from the voltage supply line Vdd to the output 110 thereof. The logic signal STOP is at the high logic value '1' only in the case in which the boosted voltage Vo becomes so high that the down-scaled voltage $Vd_0$ exceeds the band-gap voltage Vbg: the oscillator is in that case disabled (stopped), and the charge pump not clocked (the transfer of electric charge is thus blocked).

Each p-MOS transistor 325 turns on if the corresponding logic signals $CONF_1$-$CONF_{M-1}$ is at the low logic value '0' (i.e., at ground). In this case, the respective current $I_1$-$I_{M-1}$ can flow through the respective branch $320_1$-$320_{M-1}$.

A current Ir sunk by the p-MOS transistor 340 in the current-mirror stage 335 takes a value that depends on the number of transistors 325 that are turned on. In detail, if the (highest) down-scaled voltage $Vd_{M-1}$ is lower than the band-gap voltage Vbg, then all the logic signals STOP, $CONF_1$-$CONF_{M-1}$ are at the logic value '0'. Accordingly, all the transistors 325 are turned on, and the current Ir takes a value equal to:

$$Ir_{M-1}=I_0+I_1+\ldots+I\ldots+I\ldots.$$

If the down-scaled voltage $Vd_{M-1}$ is higher than the band-gap voltage Vbg, but the down-scaled voltage $Vd_{M-2}$ is lower than the band-gap voltage Vbg, then the logic signals STOP, $CONF_1$-$CONF_{M-2}$ are at the logic value '0', while the logic signal $CONF_{M-1}$ is at the logic value '1'. Accordingly, the transistors 325 are all turned on, exception made for the transistor 325 in the circuit branch $320_{M-1}$; in this case the current Ir takes a value equal to:

$$Ir_{M-2}=I_0+I_1+\ldots+I\ldots.$$

At the opposite extreme, when only the down-scaled voltages $Vd_0$ and $Vd_1$ are lower than the band-gap voltage Vbg, the logic signals STOP and $CONF_1$ are at the logic value '0' and, then, the current Ir takes the value:

$$Ir_1=I_0+I_1.$$

In this way, depending on the current value of the boosted voltage Vo, which reflects on the value of the down-scaled voltages $Vd_0$-$Vd_{M-1}$, the current Ir takes different values among a predetermined set of M discrete values. In particular, the current Ir takes decreasing values as the boosted voltage Vo (and thus the down-scaled voltages $Vd_0$-$Vd_{M-1}$) increases; in particular, a minimum value $Ir_0$ of the current Ir is equal to 10 in the case all the transistors 325 are turned off.

The first regulation signal PR takes increasing voltage values as the value of the current Ir decreases, i.e. as the boosted voltage Vo increases.

The current Ir is mirrored into the transistor 345, which sinks a current Im that takes values corresponding to the values of the current Ir in accordance with a mirroring ratio (for example, equal to 1) between the two transistors 340 and 345. The mirrored current Im is sunk by the transistor 350 and, then, the second regulation signal NR takes decreasing voltage values as the boosted voltage Vo increases.

The modular structure of the voltage regulator 115 allows generation of the current Ir in such a way that it can take only one among the predetermined number M of discrete values and, accordingly, the signals PR and NR can take only a discrete set of values, i.e. they are regulated in 'digital' way.

Figure 4:
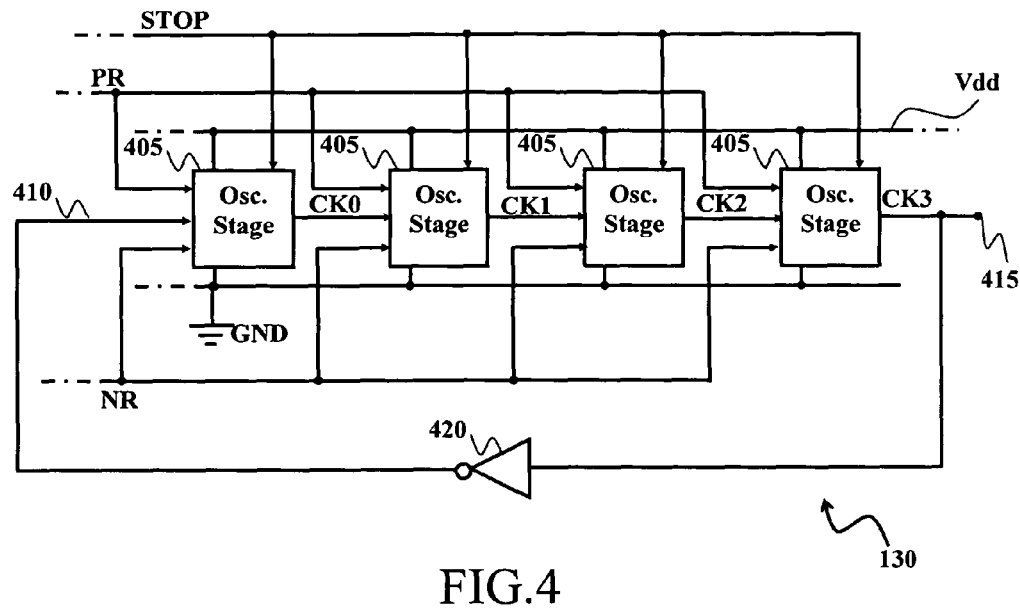
FIG. 4 schematically shows an oscillator included in the voltage booster generator of FIG. 1 according to an embodiment of the disclosure.

With reference now to FIG. 4, the oscillator 130 is illustrated in greater detail.

The oscillator 130 is, for example, a ring oscillator, in which an even number (e.g. four) of structurally identical stages 405 are cascade-connected between an input node 410 and an output node 415. An inverter 420 is feedback coupled between the output node 415 and the input node 410. Alternatively, the oscillator 130 may have an odd number of stages 405 and the inverter 420 omitted.

Each stage 405 receives the logic signal STOP that enables the stages operation, when at the low logic value '0'. When enabled, each stage 405 provides the respective clock signal CK0-CK3 at an output terminal thereof by logic inversion of a signal provided at an input terminal. In detail, the stage 405 coupled to the input terminal 410 provides the clock signal CK0 to the next stage 405, that in turn provides the clock signal CK1, complementary to the clock signal CK0 (i.e. in phase opposition). Similarly, the clock signal CK2 is complementary to the clock signal CK1 and the clock signal CK3 is complementary to the clock signal CK2. The inverter 420 feeds the inverted clock signal CK3 back to the input node 410 and in this way the clock signals CK0-CK3 is brought to switch between a low voltage value and a high voltage value. The clock signals CK0-CK3 switch between ground and the supply voltage Vdd, by each stage 405 being supplied between ground and the supply voltage Vdd.

When the logic signal STOP is at the high logic value '1', the oscillator 115 is disabled and all the clock signals CK0-CK3 do not oscillate (they are kept stable at predetermined voltages).

As known, in a ring oscillator the frequency of the signal tapped off a generic point along the ring depends on the switching delay of the generic stage 405.

In the oscillator of FIG. 4, each stage 405 further receives the first and second regulation signals PR and NR; the regulation signal are exploited to vary a switching delay of the stages 405, so as to modulate the frequency f of the generated clock signals. For example, the generic stage 405 may include a CMOS inverter with a P-MOS pull-up transistor and an N-MOS pull-down transistor, and with a P-MOS transistor controlled by the signal PR inserted between the voltage supply line Vdd and the pull-up P-MOS transistor, and an N-MOS transistor controlled by the signal NR inserted between the ground line GND and the pull-down N-MOS transistor. The signals PR and NR allow varying the conductivity of the P-MOS and N-MOS transistors, and thus the switching delay of the stage; thus, the frequency f of the clock signals CK0-CK1 is ultimately modulated by means of the first and second regulation signals PR and NR. Particularly, the frequency f increases with the decrease of the first regulation signal PR and the corresponding increase of the first regulation signal NR (in this case, the conductivity of the P-MOS and N-MOS transistors is increased, and the stage switching delay reduced); vice-versa, the frequency f decreases with the increase of the first regulation signal PR and with the corresponding decrease of the first regulation signal NR. Accordingly, the oscillator 115 operates a voltage-to-frequency conversion. The modulation of the frequency f is substantially discrete, 'digital', i.e., the frequency f may take one among a predetermined set of M predetermined discrete values, being obtained by the 'digital' regulation of the signals PR and NR.

Referring back to the voltage booster 100 of FIG. 1, depending on the value of the current Ireq required by the load 102 of the charge pump 105, the frequency f of the clock signals CK0-CK3 varies. The modulation of the frequency f is obtained by feeding the boosted voltage Vo generated by the charge pump 105 back to the voltage regulator 115.

First, the voltage regulator 115 operates an analog-to-digital conversion of the boosted voltage Vo for obtaining the corresponding values for logic signals $CONF_1$-$CONF_{M-1}$. Successively, the logic signals $CONF_1$-$CONF_{M-1}$ are converted into a specific value for the current Ir, the value taken by the current Ir belonging to a set of discrete, predetermined values; the value of the current Ir increases/decreases of discrete steps in accordance with the decrease/increase of the boosted voltage Vo, and thus ultimately with the increase/decrease of the current Ireq required by the load 102 of the charge pump 105. The value of the current Ir is converted into a corresponding value for the first and second regulation signals PR and NR, which 'digitally' modulates the clock signals' frequency f.

The charge pump 105 can thus supply a current that can take a predetermined number M of discrete values $II_0$-$II_{M-1}$. Particularly, if the value of the current Ireq required by the load 102 is $II_k$<Ireq<$II_{k+1}$ (with k=0, ..., M−2), the charge pump 105 actually provides either the value $II_k$ or the value $II_{k+1}$, depending on whether the boosted voltage Vo is higher or lower than the target value, respectively. Until the boosted voltage Vo is higher than the target value, the current that the charge pump can supply is equal to $II_k$; when the boosted voltage Vo falls below the target value, the current deliverable by the charge pump becomes equal to $II_{k+1}$.

When the oscillator 130 is disabled by asserting the logic signal STOP to the high logic value '1', the charge pump 105 is turned off (no electric charge transfer takes place).

Advantageously, the modular structure of the voltage regulator 115 greatly simplifies the design of the voltage booster, at the same providing a high flexibility in tracking varying requirements of deliverable current. In fact, the design of the voltage regulator can be adapted to different expected charge pump loads 102 by varying the number of circuit branches of the voltage regulator 115. Considering the application of the voltage booster in the IC memory field, an existing design of voltage booster according to an embodiment of the present disclosure, exploiting a 'digital' modulation of the frequency f, can readily be adapted to a different type of memory and integrated with the required technology. The design of the voltage booster 100 according to an embodiment of the present disclosure is thus very flexible. It is adapted to deliver a small current (in the order of tens of microamperes), if only one memory cell has to be programmed, as well as a great current (in the order of some milliamperes), if a plurality of memory cells has to be programmed (e.g. 64 memory cells).

Furthermore, a voltage booster with 'digital' modulation of the clocking frequency f according to an embodiment of the present disclosure has a faster response than devices in which an 'analog' frequency modulation is exploited, because of the absence of the compensation capacitors typically needed in those cases; therefore, the voltage booster according to an embodiment of the present disclosure is adapted also to efficiently work in applications involving impulsive consumptions, like in a phase of reading memory cells of a semiconductor memory. The voltage booster according to an embodiment of the present disclosure also occupies a relatively small area on chip, then satisfying the continuous request for hastening and shrinking memory devices. In addition, the modular structure provides a voltage booster more stable with respect to process spreads.

The modular structure of the voltage booster makes it easier to interface the circuit with the logic of the IC where the voltage booster has to be integrated, exhibiting a significant adaptation to changes in drained current. The voltage booster of an embodiment of the present disclosure can be advantageously used in, e.g., a Flash NOR semiconductor memory, so as to improve the performance in the different operating conditions (reading, programming, etc), as well as in different memories.

Figure 5:
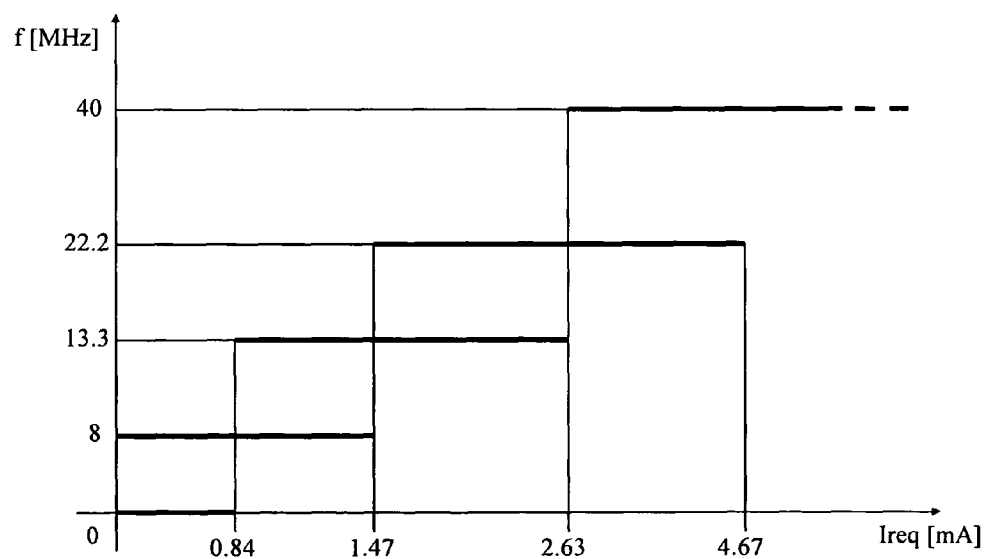
FIG. 5 is a frequency-current diagram of the voltage booster of FIG. 1, according to an embodiment of the disclosure.

FIG. 5 is a current-frequency diagram illustrating the relation between M (e.g., four) predetermined values of the current Ireq, sunk by the load 102, and corresponding values of the frequency f of the clock signals generated by the oscillator 115. The frequency f is on the ordinates axis, while the current Ireq is on the axis of the abscissa. The frequency f is shown increasing for increasing values of the current Ireq, particularly the frequency f is about 8 MHz for a drained current of 0.84 mA, about 13.3 MHz for a drained current of 1.47 mA, about 22.2 MHz for a drained current of 2.63 mA and 40 MHz for a drained current of 4.67 mA.

Figure 6:
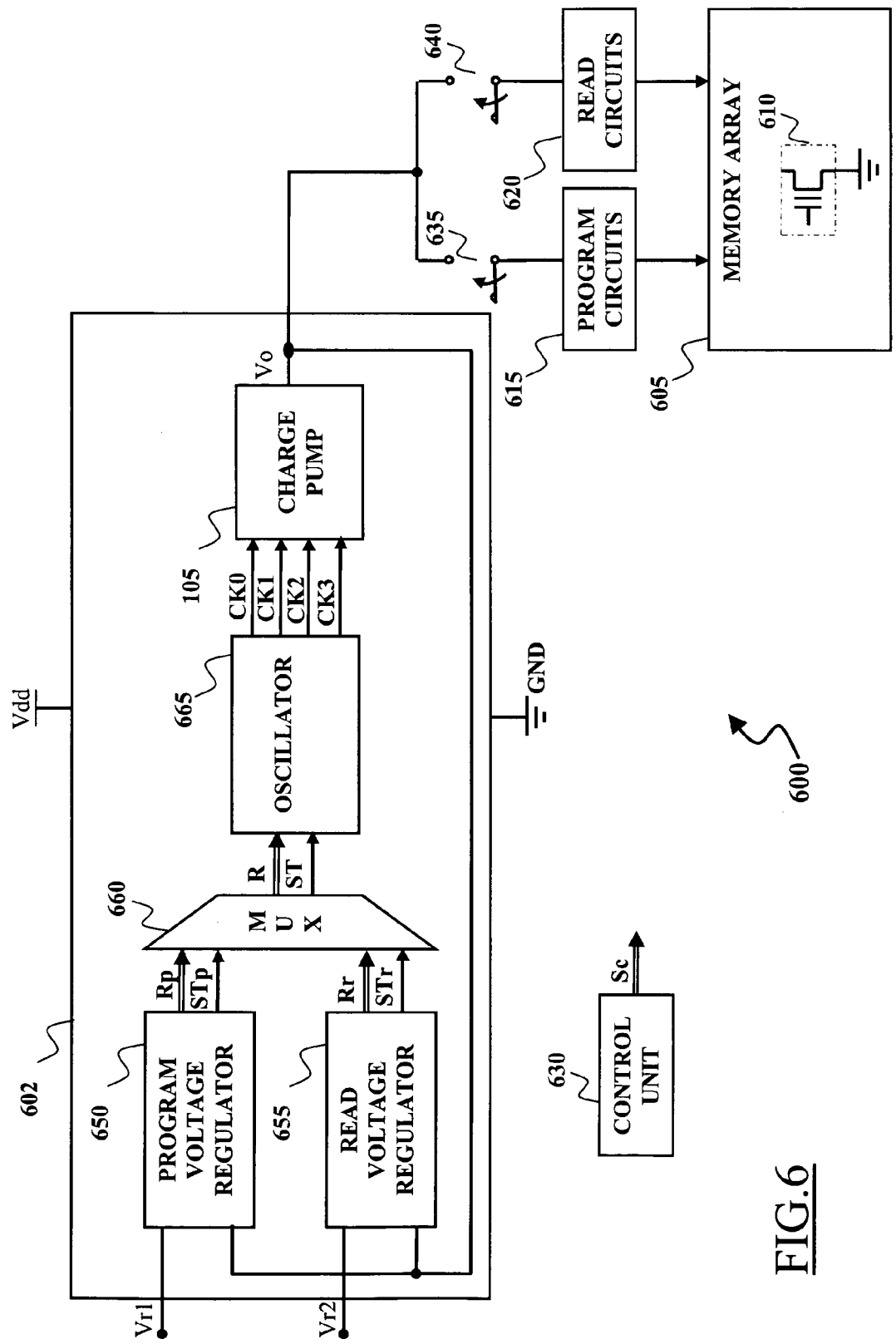
FIG. 6 schematically illustrates a portion of a memory including a voltage booster in which an embodiment of the present disclosure is applied.

Considering FIG. 6, a portion of a non-volatile semiconductor memory 600 is schematically illustrated in terms of the blocks relevant to the description of the present disclosure. Particularly, FIG. 6 shows how to interface a voltage booster generator 602 according to an embodiment of the present disclosure with other circuits of the memory 600.

The memory 600, for example a flash memory, includes an array 605 of memory cells 610 adapted to store data in a non-volatile way; each memory cell 610 may for example include a floating-gate n-MOS transistor.

The memory array 605 is coupled to program circuits 615 and read circuits 620 adapted to program and read selected memory cells 610, respectively. For a read or program operation the read or program circuits 620 or 615 have to bias the memory cells 610 at the suitable operation voltage Vo.

The operation voltage Vo is supplied by the voltage booster 602 and selectively provided to the program circuits 615 or to the read circuits 620, depending on the operation to be performed on the memory cells 610. The memory 600 further includes a control unit 630, which provides control signals, indicated Sc as a whole, for managing the read and program operations; In particular, the control signals Sc selectively enable the connection of the program and read circuits 615 and 620 to the high voltage generator 602 by means of, for example, switches 635 and 640, respectively.

The voltage booster 602 includes a charge pump 105 for providing the operation voltage Vo boosted starting from the supply voltage Vdd. As described above, the charge pump 105 uses the clock signals CK0-CK3 for its internal temporized charge transfer.

The voltage booster 602 also includes a program voltage regulator 650, in accordance with an embodiment of the present disclosure, and a read voltage regulator 655, which both receive in feedback the operation voltage Vo. The program voltage regulator 650 and the read voltage regulator 655 further receive respective reference voltages Vr1 and Vr2, supplied by reference voltage generators (not shown in the drawing). The program voltage regulator 650 provides program frequency regulation signal Rp and a program oscillator stop logic signal STp, depending on the boosted voltage Vo and on the target value thereof in the program operation (related to the reference voltage Vr1); the read voltage regulator 655 provides read frequency regulation signals Rr and a read oscillator stop logic signal STr, depending on the boosted voltage Vo and on the target value thereof in the read operation (related to the reference voltage Vr1). A multiplexer (MUX) 660 selectively routes the read or program frequency regulation signals Rr and Rp, and the read or program oscillator stop logic signals STr or STp towards an oscillator 665, depending on the operation to be performed on the memory cells (the multiplexer 660 may be controlled by the control unit 630).

The oscillator 665 generates the clock signals CK0-CK3 whose oscillation frequency f is modulated by means of the program regulation signals Rp or of the read regulation signals Rr. Particularly, during a program operation the frequency f is modulated in a 'digital' way by means of the program voltage regulator 650 according to an embodiment of the present disclosure, while during a reading operation the frequency f can be kept constant at a certain value, or adjusted with the same digital modulation technique previously described, properly managed.

Although one or more embodiments of the present disclosure have been disclosed and described, it is apparent to those skilled in the art that several modifications to the described embodiments, as well as other embodiments of the present disclosure are possible without departing from the scope of the disclosure.

For example, the charge pump is described by exploiting an exemplifying architecture and many other alternative architecture can be used.

A reference voltage different from the band-gap voltage can be exploited and/or provided externally. The voltage divider can be implemented in a different way, with different component, with a different number of resistors or with a structure different from the series. The operational amplifiers can be substituted with a different differential circuit or other circuit adapted to perform comparisons of electrical quantities and the inverters can be dispensed for, by inverting the voltages provided at the input terminals of the operational amplifiers or by exploiting n-MOS transistors in the circuital branches. The circuital branches can be implemented with a structure different from a series of a transistor and a current generator. Furthermore, a different number of regulation signals can be provided and the second regulation signal can be obtained with a circuit alternative to a current-mirror.

In addition, the oscillator can have an architecture different from that of a ring oscillator or a different number of stages can be implemented. In the description four clock signals are exploited, but nothing prevents the use of another number of clock signals, particularly, a lower number.

As described above, a voltage booster according to an embodiment of the present disclosure can be combined with other circuits not exploiting the 'digital' modulation. In addition, the devised voltage booster can be combined with circuits exploiting the 'digital' modulation having a different number of circuit branches for obtaining another number of current values provided by the voltage booster.

A memory, such as a non-volatile memory, may include a voltage booster 100 (FIG. 1) or 602 (FIG. 6), and a system, such as a computer system, may incorporate the memory.

What is claimed is:

1. A voltage booster for generating a boosted voltage, including:
    a charge pump adapted to generate the boosted voltage starting from a supply voltage by a transfer of electric charge controlled by a plurality of oscillating signals having an oscillation frequency;
    an oscillator for providing the plurality of oscillating signals; and
    a regulation circuit arranged to receive a voltage related to the boosted voltage and to perform comparisons of the related voltage and a reference voltage, and adapted to provide at least one regulation signal indicative of a result of said comparison, wherein said regulation signal is fed to the oscillator to control said oscillation frequency, and wherein said regulation circuit is adapted responsive to said comparisons to cause the at least one regulation signal to have a current value that is a sum of a plurality of discrete non-zero current values so that each oscillation frequency of the plurality of oscillating signals accordingly takes on one among a plurality of discrete oscillation frequency values.

2. The voltage booster according to claim 1, wherein the regulation circuit is further adapted to generate a charge pump enable/disable control signal for enabling/disabling the charge pump in response to a comparison between the voltage related to the boosted voltage and the reference voltage.

3. A voltage booster for generating a boosted voltage, including:
    a charge pump adapted to generate the boosted voltage starting from a supply voltage by a transfer of electric charge controlled by at least one oscillating signal having an oscillation frequency;
    an oscillator for providing the oscillating signal; and
    a regulation circuit arranged to receive a voltage related to the boosted voltage and to perform a comparison of the related voltage and a reference voltage, and adapted to provide at least one regulation signal indicative of a result of said comparison, wherein said regulation signal is fed to the oscillator to control said oscillation frequency, wherein said regulation circuit is adapted to cause the at least one regulation signal take one among a plurality of discrete values, depending on the result of said comparison, so that the oscillation frequency of the at least one oscillating signal accordingly takes on one among a plurality of discrete oscillation frequency values, said regulation circuit including:
    a voltage divider circuit adapted to receive said related voltage and to generate a plurality of down-scaled voltages;
    a plurality of circuital branches, each one adapted to generate a respective electrical quantity,
    enabling/disabling circuits coupled to each of said circuital branches, each one adapted to enable/disable the respective circuital branch based on a result of a comparison between a respective one of said plurality of down-scaled voltages and the reference voltage, and
    a combining circuit adapted to generate the regulation signal based on a combination of the electrical quantities generated by the enabled circuital branches.

4. The voltage booster according to claim 3, wherein each circuital branch is adapted, when enabled, to supply a respective current at an output node thereof.

5. The voltage booster according to claim 3, wherein each circuital branch further includes a switch, controlled by the respective enabling/disabling circuit, for coupling/decoupling the respective circuital branch to/from the combining circuit.

6. The voltage booster according to claim 4, wherein the combining circuit includes a current/voltage converter, coupled to each of said circuit branches at a coupling node, the current/voltage converter being adapted to convert a sum of the currents provided by the enabled circuital branches into the regulation signal.

7. The voltage booster according to claim 6, wherein the current/voltage converter includes a first output branch coupled to said coupling node so as to be run through by a sum current being the sum of the currents provided by the enabled circuital branches and supplying a first regulation signal at a first output node of the regulation circuit, and a second output branch coupled to the first output branch so as to be run through by a current related to said sum current and supplying a second regulation signal at a second output node of the regulation circuit.

8. The voltage booster according to claim 7, wherein the first and second output branches are in current-mirror configuration.

9. The voltage booster according to claim 5, wherein the enabling/disabling circuits includes each a voltage comparator, arranged to receive and perform a comparison of a respective one of said down-scaled voltages and the reference voltage, and to generate a respective comparison signal indicative of a result of the comparison, the comparison signal controlling the switch included in the associated circuital branch.

10. A non-volatile memory device including at least one voltage booster generator for generating a boosted voltage, wherein the voltage booster includes:
    a charge pump adapted to generate the boosted voltage starting from a supply voltage by a transfer of electric charge controlled by a plurality of oscillating signals having an oscillation frequency;
    an oscillator for providing the plurality of oscillating signals; and
    a regulation circuit arranged to receive a voltage related to the boosted voltage and to perform a comparison of the related voltage and a reference voltage, and adapted to provide at least one regulation signal indicative of a result of said comparison, wherein said regulation signal is fed to the oscillator to control said oscillation frequency, said regulation circuit being adapted responsive to said comparison to cause the at least one regulation signal to have a current value that is one among a plurality of discrete current values so that said oscillation frequency of the plurality of oscillating signals accordingly can take on one among a plurality of discrete oscillation non-zero frequency values.

11. A method of generating a boosted voltage by means of a timed transfer of electric charge, including:
   generating a plurality of oscillating signals each having an oscillation frequency for controlling said means of said transfer of electric charge;
   comparing a voltage related to the boosted voltage to a plurality of reference voltages, and, based on a result of said comparisons to generate a plurality of discrete non-zero current values, providing one discrete non-zero current value that is a sum of said plurality of discrete non-zero current values for controlling the oscillation frequency of the plurality of oscillating signals,
   wherein said oscillation frequency of the plurality of oscillation signals comprises one among a plurality of discrete oscillation non-zero frequency values, depending on the result of said comparisons.

12. A voltage generator, comprising:
   a charge pump operable to generate an output voltage in response to clock signals;
   an oscillator coupled to the charge pump and operable to generate the clock signals and combine; and
   a regulator coupled to the charge pump and to the oscillator and operable to provide a finite number of at least three non-zero discrete current values to cause the oscillator to generate each of the clock signals substantially having a frequency that is related to the output voltage, and to limit the frequency to a finite number of non-zero frequency values wherein the finite number is at least three by comparing said output voltage with a plurality of reference voltages and combining the at least three non-zero discrete current values to generate a control signal.

13. The voltage generator of claim 12 wherein the charge pump comprises a switched-capacitor charge pump.

14. The voltage generator of claim 12 wherein:
   the regulator is operable to
   generate a control signal having a level that is related to the output voltage and to provide the control signal to the oscillator, and
   limit the level of the control signal to a finite number of levels that respectively correspond to the finite number of frequency values; and
   the oscillator is operable to generate each of the clock signals substantially having a frequency that corresponds to the level of the control signal.

15. The voltage generator of claim 12 wherein:
   the regulator is operable to
   convert the output voltage into a digital signal having one of a finite number of values that respectively correspond to the finite number of frequency values, and
   provide the digital signal to the oscillator; and
   the oscillator is operable to generate each of the clock signals substantially having a frequency that corresponds to the value of the digital signal.

16. The voltage generator of claim 12 wherein the oscillator comprises a ring oscillator having a respective oscillator stage for each clock signal.

17. The voltage generator of claim 12 wherein the oscillator is operable to generate the clock signals having different phases.

18. The voltage generator of claim 12 wherein the finite value is eight or less.

19. A voltage generator, comprising:
   a charge pump operable to generate an output voltage in response to clock signals;
   an oscillator coupled to the charge pump and operable to generate the clock signals; and
   a regulator coupled to the charge pump and to the oscillator and operable to cause the oscillator to generate each of the clock signals substantially having a frequency that is related to the output voltage, and to limit the frequency to a finite number of frequency values;
   wherein the regulator is further operable to
      convert the output voltage into digital current signals each having one of a finite number of values, the finite number being at least three, that respectively correspond to the finite number of frequency values,
      convert the digital signals into an analog control signal having a level that corresponds to the value of the digital signal, and
      provide the analog control signal to the oscillator; and
   wherein the oscillator is further operable to generate each of the clock signals substantially having a frequency that corresponds to the level of the analog control signal.

20. A voltage generator, comprising:
   a charge pump operable to generate an output voltage in response to clock signals;
   an oscillator coupled to the charge pump and operable to generate the clock signals; and
   a regulator coupled to the charge pump and to the oscillator and operable to cause the oscillator to generate each of the clock signals substantially having a frequency that is related to the output voltage, and to limit the frequency to a finite number of frequency values;
   wherein the regulator is further operable to
      convert the output voltage into a first digital signal having one of a finite number of values, the finite number being at least three, that respectively correspond to the finite number of frequency values,
      convert the first digital signal into a second digital signal having a discrete current value that corresponds to the value of the first digital signal,
      convert the second digital signal into control signals each having a respective level that corresponds to the value of the second digital signal, and
      provide the control signals to the oscillator; and
   wherein the oscillator is further operable to generate each of the clock signals substantially having a frequency that corresponds to the levels of the control signals.

21. A voltage generator, comprising:
   a voltage output node;
   a charge pump coupled to the voltage output node;
   an oscillator adapted to generate a plurality of clock signals substantially having a common frequency, the oscillator having clock output nodes coupled to the charge pump and having a first control node for receiving a control signal comprising a sum of a plurality of discrete non-zero current control signals; and
   a plurality of at least three analog-to-digital converters configured to generate said plurality of discrete non-zero control signals, each converter having an input node coupled to the voltage output node and having an output node coupled to the first control node of the oscillator.

22. A voltage generator, comprising:
a voltage output node;
a charge pump coupled to the voltage output node configured to generate an output voltage;
an oscillator having clock output nodes coupled to the charge pump and having a first control node;
an analog-to-digital converter having an input node coupled to the voltage output node and having an output node coupled to the first control node of the oscillator, the analog-to-digital converter configured to covert the output voltage into a plurality of digital current signals; and
a digital-to-analog converter coupled between the analog-to-digital converter and the oscillator and having an input node coupled to the output node of the analog-to-digital converter and having an output node coupled to the control node of the oscillator, the digital-to-analog converter configured to covert the plurality of digital current signals into a control signal.

23. A voltage generator, comprising:
a voltage output node;
a charge pump coupled to the voltage output node configured to generate an output voltage;
an oscillator having clock output nodes coupled to the charge pump and having first and second control nodes;
an analog-to-digital converter having an input node coupled to the voltage output node and having an output node coupled to the first control node of the oscillator, the analog-to-digital converter configured to covert the output voltage into a plurality of digital current signals; and
a digital-to-analog converter coupled between the analog-to-digital converter and the oscillator and having an input node coupled to the output node of the analog-to-digital converter and having first and second output nodes respectively coupled to the first and second control nodes of the oscillator, the digital-to-analog converter configured to covert the plurality of digital current signals into a control signal.

24. An integrated circuit, comprising:
a voltage booster, comprising,
    a charge pump operable to generate an output voltage in response to clock signals,
    an oscillator coupled to the charge pump and operable to generate the clock signals, and
    a regulator coupled to the charge pump and to the oscillator and operable to
        provide discrete non-zero current values to cause the oscillator to generate each of the clock signals having a respective phase and substantially having a frequency that is related to the output voltage, and
        limit the frequency to a finite number of non-zero frequency values wherein the finite number is at least two;
    wherein the output voltage from the charge pump is converted into a plurality of current signals which are summed to generate a control signal to control the oscillator.

25. An integrated circuit, comprising:
a voltage generator, comprising,
    a voltage output node,
    a charge pump coupled to the voltage output node configured to generate an output voltage,
    an oscillator adapted to generate a plurality of clock signals having a substantially common frequency, the oscillator having clock output nodes coupled to the charge pump and having a first control node, and
    a plurality of at least three analog-to-digital converters each having an input node coupled to the voltage output node and having an output node coupled to the first control node of the oscillator, the plurality of at least three analog-to-digital converters operable to generate a plurality of discrete non-zero current values for controlling the oscillator;
    wherein the output voltage from the charge pump is converted into a plurality of current signals which are summed to generate a control signal to control the oscillator.

26. A system, comprising:
an integrated circuit, comprising,
    a voltage booster, comprising,
        a charge pump operable to generate an output voltage in response to clock signals,
        an oscillator coupled to the charge pump and operable to generate the clock signals, and
        a regulator coupled to the charge pump and to the oscillator and operable to
            provide discrete non-zero current values to cause the oscillator to generate each of the clock signals having a respective phase and substantially having a frequency that is related to the output voltage, and
            limit the frequency to a finite number of non-zero frequency values wherein the finite number is at least two;
    wherein the output voltage from the charge pump is converted into a plurality of current signals which are summed to generate a control signal to control the oscillator.

27. A system, comprising:
an integrated circuit, comprising:
    a voltage generator, comprising,
        a voltage output node,
        a charge pump coupled to the voltage output node configured to generate an output voltage,
        an oscillator adapted to generate a plurality of clock signals having a substantially common frequency, the oscillator having clock output nodes coupled to the charge pump and having a first control node, and
        a plurality of at least three analog-to-digital converters each having an input node coupled to the voltage output node and having an output node coupled to the first control node of the oscillator, the plurality of at least three analog-to-digital converters operable to generate a plurality of discrete non-zero current values for controlling the oscillator;
    wherein the output voltage from the charge pump is converted into a plurality of current signals which are summed to generate a control signal to control the oscillator.

28. A method, comprising:
generating a voltage in response to clock signals;
generating a plurality of discrete non-zero current values that are related to the voltage, the values being limited to a finite number of non-zero values wherein the finite number is at least three; and
generating the clock signals each substantially having a frequency related to the value, the frequency being limited to a finite number of non-zero frequencies, the generating of the clock signals controlled by a sum of at least two of the plurality of discrete non-zero current values.

29. The method of claim 28 wherein generating the value comprises converting the voltage into a digital value.

30. A method, comprising:
generating a voltage in response to clock signals;
generating a value that is related to the voltage, the value being limited to a finite number of values, the finite number being at least three; and
generating the clock signals each substantially having a frequency related to the value,
wherein generating the value comprises
    converting the voltage into a digital value;
    converting the digital value into control values as sums of at least two of the digital values; and
wherein generating the clock signals comprises generating the clock signals based on the control values, each clock signal substantially having a frequency related to the control values and being one of a finite number of discrete non-zero frequency values.

31. A method, comprising:
generating a voltage in response to clock signals;
converting the voltage into one of a plurality of at least three discrete non-zero values;
generating the clock signals in response to receiving a control value, each clock signal substantially having a one of a finite number of discrete non-zero frequencies related to the discrete value, the control value comprising a sum of at least two of the plurality of discrete non-zero values.

32. A method, comprising:
generating a voltage in response to clock signals, the voltage comprising an analog signal;
converting the voltage into digital values each digital value one of a plurality of discrete finite non-zero digital values;
generating an analog control signal in response to a sum of at least two digital values; and
generating the clock signals in response to receiving the analog control value, each clock signal substantially having a frequency that is one of a finite number of discrete non-zero frequencies related to the digital values, wherein generating the clock signals comprises generating the clock signals each substantially having the frequency in response to the analog control signal.

* * * * *